United States Patent
Hauselt et al.

(10) Patent No.: US 7,161,318 B2
(45) Date of Patent: Jan. 9, 2007

(54) REGULATING DEVICE FOR A MOTOR

(75) Inventors: Peter Hauselt, Poppenricht (DE); Josef Kaser, Ebermannsdorf (DE); Annemarie Lehmeier, Ursensollen (DE); Martin Meinke, Amberg (DE); Karl Niedermeier, Kitzingen (DE); Christoph Nöth, Burglauer (DE); Jens Ulrich, Langewiesen (DE); Roman Wunschik, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/468,735

(22) PCT Filed: Feb. 7, 2002

(86) PCT No.: PCT/DE02/00452

§ 371 (c)(1),
(2), (4) Date: Mar. 11, 2004

(87) PCT Pub. No.: WO02/067405

PCT Pub. Date: Aug. 29, 2002

(65) Prior Publication Data

US 2004/0155619 A1 Aug. 12, 2004

(30) Foreign Application Priority Data

Feb. 22, 2001 (DE) .............................. 101 08 548

(51) Int. Cl.
*H02P 7/00* (2006.01)

(52) U.S. Cl. .................. 318/439; 318/434; 361/23; 361/24; 361/25; 361/26

(58) Field of Classification Search ................ 318/254, 318/439, 434; 361/31, 22, 24, 99, 23, 25, 361/26
See application file for complete search history.

(56) References Cited

U.S. PATENT DOCUMENTS

| | | | | | |
|---|---|---|---|---|---|
| 3,586,910 | A | * | 6/1971 | Sauber | 361/22 |
| 4,034,570 | A | * | 7/1977 | Anderson et al. | 62/158 |
| 4,084,406 | A | * | 4/1978 | Brenneman | 62/211 |
| 4,899,551 | A | * | 2/1990 | Weintraub | 62/176.6 |
| 4,941,325 | A | * | 7/1990 | Nuding | 62/158 |
| 5,017,846 | A | * | 5/1991 | Young et al. | 318/244 |
| 5,068,033 | A | * | 11/1991 | Tobias et al. | 210/169 |
| 5,237,481 | A | * | 8/1993 | Soo et al. | 361/103 |
| 5,262,704 | A | * | 11/1993 | Farr | 318/434 |
| 5,519,558 | A | * | 5/1996 | Ennis et al. | 361/31 |

(Continued)

FOREIGN PATENT DOCUMENTS

DE    4209167    9/1993

(Continued)

*Primary Examiner*—Rita Leykin
(74) *Attorney, Agent, or Firm*—Harness, Dickey & Pierce, P.L.C.

(57) ABSTRACT

The invention relates to a regulating device (1) for a motor, comprising a housing (2) which can be associated with said motor and in which a control unit (5) and an actuator (6) are arranged. Due to heat-related reasons, said device can only be used in an encapsulated manner, for example close to a motor. In order to solve this problem, the actuator (6) comprises an electromagnetic switching element (8*a*,8*b*) and the control signal (7) for the same is designed as a timing signal which is measured—taking into consideration at least one heat source inside or optionally outside the housing (2)—in such a way that the operating temperature of the electromagnetic switching element (8*a*,8*b*) is below an upper authorised limiting value.

21 Claims, 1 Drawing Sheet

U.S. PATENT DOCUMENTS

| | | | |
|---|---|---|---|
| 5,644,510 A * | 7/1997 | Weir | 702/132 |
| 5,761,018 A * | 6/1998 | Blakely | 361/23 |
| 6,111,377 A * | 8/2000 | Hertzog et al. | 318/439 |
| 6,252,752 B1 * | 6/2001 | Nagahama | 361/31 |
| 6,310,330 B1 * | 10/2001 | Stevanovic et al. | 219/494 |
| 6,453,260 B1 * | 9/2002 | Prough | 702/132 |
| 6,504,697 B1 * | 1/2003 | Hille | 361/103 |
| 6,710,558 B1 * | 3/2004 | Mack et al. | 318/254 |
| 6,739,145 B1 * | 5/2004 | Bhatnagar | 62/127 |

FOREIGN PATENT DOCUMENTS

| | | |
|---|---|---|
| DE | 29723145 | 4/1998 |
| DE | 19704801 | 8/1998 |
| DE | 29916114 | 8/2000 |
| WO | WO9913565 | 3/1999 |

* cited by examiner

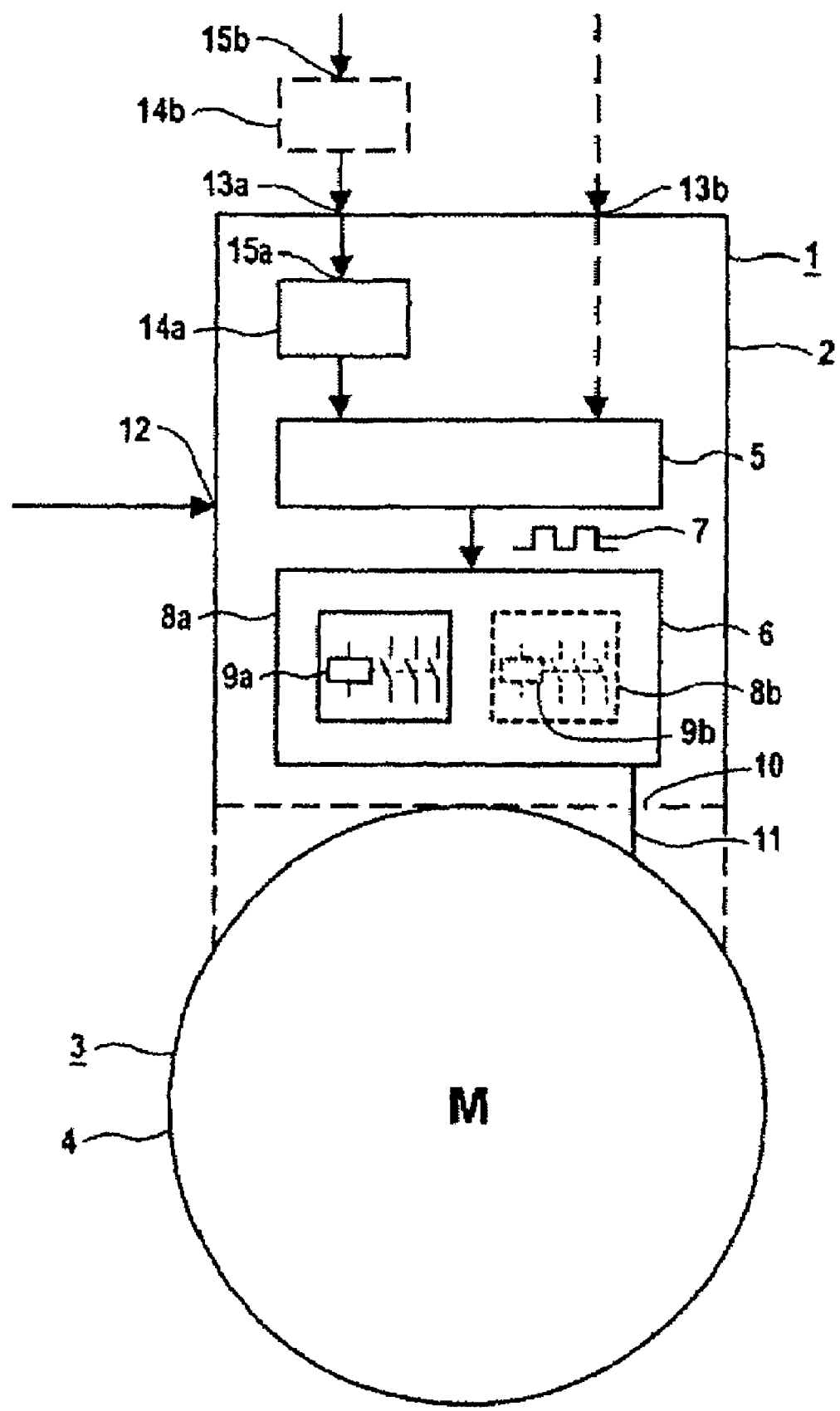

REGULATING DEVICE FOR A MOTOR

This application is the national phase under 35 U.S.C. § 371 of PCT International Application No. PCT/DE02/00452 which has an International filing date of Feb. 7, 2002, which designated the United States of America and which claims priority on German Patent Application number DE 101 08 548.6 filed Feb. 22, 2001, the entire contents of which are hereby incorporated herein by reference.

FIELD OF THE INVENTION

The invention generally relates to a control apparatus for a motor.

BACKGROUND OF THE INVENTION

A control apparatus is used in conjunction with further elements inter alia for starting, switching on and switching off equipment, such as a motor. The area of application of such control apparatuses extends, for example, from use in a controller for systems to use in machines.

A control apparatus of a generic type with elements such as a control unit and a control element in the form of a switching device have been known for a long time in practice. Switching devices of this type have been widely tested and been very well proven in practice, but can be used only to a limited extent in a direct encapsulated application, for example close to a motor, owing to their operating characteristics.

DE 197 04 801 C2 has also disclosed a motor switching stage with a drive unit which has electronic switching devices and cooling elements.

The problems in this case are firstly the power loss which is produced during operation of the electronic switching devices and is counteracted by complex cooling measures. Secondly, owing to safety considerations, an additional switching device is often required, to carry out the task of disconnection via switching pieces in order to produce an air gap.

SUMMARY OF THE INVENTION

An embodiment of the invention is based on an object of specifying an apparatus with operating characteristics which are better than those with the prior art and which allows physically compact and quick arrangement on the equipment to be switched. The apparatus is also intended to include switching with low power losses and with reliable disconnection.

An object may be achieved by an apparatus in which, according to an embodiment of the invention, the control element has an electromagnetic switching element and the control signal is in the form of a clock signal. Taking into account at least one heat source within or possibly outside the housing, this clock signal is designed such that the operating temperature of the switching element is below an upper maximum permissible limit value.

This control apparatus for a motor on the one hand allows the switching pieces of the electromagnetic switching element to be disconnected reliably via an air gap. On the other hand, the control element is chosen such that, despite being used in an encapsulated environment, it can be operated close to a motor, for example with low power losses and thus without any cooling measures.

The saving of a motor terminal board and of the associated wiring which can be achieved by an embodiment of the invention is due not least to the already defined and compact design. This is dependent on quick and nevertheless fault-free connection of equipment and the control device. The decentralized arrangement of the control apparatus in comparison to a conventional central control apparatus indicates that less space is required owing to the lack of switchgear cabinets and cable runs, and also allows the material cost to be reduced, by cable savings. Furthermore, a further comparison shows a cost advantage with reduced installation costs and shorter commissioning times.

The switching element preferably has at least one contactor. Contactors allow various starting and operating configurations to be switched. In this case, the configurations can be chosen, inter alia, and direct starters or reversing starters, and, furthermore, any operating states can be switched. Contactors can be used very largely in any orientation and offer further connection options by way of auxiliary contacts, which may also be in the form of positive opening contacts. Positive opening contacts play an important role, particularly for safety purposes. This component provides a proven and reliable switching element.

The contactor is provided in a simple manner with overload and/or overcurrent protection. These devices are used to protect lines, cables, connecting points and connection points and equipment against excessive heating. The overload protection for a motor, for example, can be controlled via thermocouples which are integrated in the motor windings.

The housing advantageously has at least one input for connection to a power supply network. This allows simple electrical and mechanical coupling of a mains cable, which may already in some circumstances be prefabricated, and, possibly, allows the power supply to be passed through to further equipment.

The housing expediently has at least one control input for the control unit. In a similar way to the input for the connection to the power supply network, an economic connection technique can also be used in this case for electrical and mechanical coupling of a control line to the control input.

The control unit can advantageously be driven directly or indirectly via a communication module. This type of functional breakdown not only allows the motor to be controlled directly but also allows it to be controlled indirectly, and to be linked to a bus system. Functional interaction between direct and indirect drive can likewise be provided by such circuitry.

The communication module preferably has an interface to a bus system. The link to the interface to a bus system results in further advantages, such as that of central control and instrumentation. This results in flexibility in terms of the use of functions and procedures, coverage of a requirement for complex applications, savings in operating cost resulting from system intelligence and transparency with respect to the operating states, which can be implemented using visualization techniques.

BRIEF DESCRIPTION OF THE DRAWINGS

Further advantages and details of embodiments of the invention will be explained in more detail in the following text with reference, by way of example, to the drawings.

The single FIGURE shows a schematic arrangement of a control apparatus on a motor.

Identical parts in the figure are provided with the same reference symbols, or reference symbols in a similar sense, in the following text.

DETAILED DESCRIPTION OF THE PREFERRED EMBODIMENTS

Design details will be described first of all, followed by functional and control details.

The control apparatus 1 has a housing 2 which can be matched to a motor housing 4 of a motor 3 which is surrounded by this motor housing 4, and can be matched to its contours. The housing 2 may in this case be in the form of a motor terminal box, complying with various ingress protection classes, as required. The arrangement of the control apparatus 1 on the motor housing 4 may be provided with attachment devices that are familiar from the prior art. The attachment may be provided in a force-fitting and/or interlocking manner.

In contrast to previous control apparatuses, also in the form of motor starters or of starters in the form of electromagnetic switching elements, no separate housing is any longer required for the embodiment of the housing 2 as a motor terminal box. There is no need for the previous complex connections between the control apparatus and the motor. The control apparatus 1 is combined with the motor 3 and the motor housing 4 to form a single functional and physical unit.

At least one opening 10 is incorporated in the area of the attachment of the control apparatus 1 of the motor housing 4 and can be used as a connecting channel for an electrical connecting device, for example for a motor connecting cable, in particular for winding ends 11 of the motor 3. An opening in the form of an elongated hole parallel to the contactor longitudinal axis is preferably included on a mounting surface of the housing 2, through which individual winding ends 11, or else all of the winding ends 11, of the motor 3 can be passed into the housing 2.

The housing 2 contains a control unit 5 and a control element 6, with the control element 6 being supplied with a control signal 7 from the control unit 5. The control signal 7 is in this case in the form of a clock signal. Further units relating to the function, such as a brake rectifier, can be added and connected as desired in the housing 2.

The control element 6 has at least one first, and possibly also an optional second, electromagnetic switching element 8a and 8b. The first and the second electromagnetic switching elements 8a and 8b have a respective contactor 9a and 9b with corresponding terminal points, which are not shown here. The terminal points may optionally be in the form of screw terminals or spring-tongue terminals, in the form of blade connections or solder connections. Associated connecting cables must be provided with an appropriate connecting device, as a function of this.

The winding ends of the motors are normally connected to a motor terminal board. This motor terminal board is also used for connection of the power supply which is normally supplied from the outside by way of a cable screw connection. The newly proposed arrangement of the contactors 9a, 9b here in conjunction with the opening 10 in a mounting surface of the housing 2 allows a short and direct connection of the winding ends 11 of the motor 3 to the terminal points of the contactors 9a, 9b. There is no longer any need for a motor terminal board.

Based on a three-phase motor, two winding ends 11 are preferably in each case interconnected to a conductor end sleeve or a similar connecting device, so that only three winding ends 11 still need to be connected to the terminals of one or to the contactors 9a, 9b. The connections are made for other motor types in the same sense.

The contactors 9a and 9b are preferably arranged vertically in the longitudinal direction with respect to one another in the housing 2. This allows virtually optimum access to the terminal points. Any desired change in the wiring for the main circuits may be made by way of prefabricated current links. The contactors 9a and 9b may alternatively be connected to the housing 2 via screw attachments and/or snap-action attachments. In the case of snap-action attachments, one mounting surface of the housing 2 is provided with a contour in the form of a top-hat rail, which is formed during the actual process of producing the housing.

The housing 2 may be produced from various materials, for example from steel, aluminum, as well as an aluminum die-casting, rubber or else from plastic such as PPTP. In the case of a rubber or plastic housing, there are additional advantages with regard to shaping by way of the versatile processing techniques, which have been proved in practice, and the potential cost savings which result from them in terms of use of materials and for any reworking that may be required.

Furthermore, attachment options can be provided in a simple manner for the control unit 5 which may be in the form of a control board, and for a switching device or the like. With regard to electrical safety, there are also advantages from the additional isolation provided by the materials and, in consequence, short creepage distances and air gaps.

The control element 6 acts by way of the contactor 9a on the motor 3 at least via the first electromagnetic switching element 8a. The contactor 9a has switching contacts which can connect and disconnect both a main current and a control current. Positively opening switching contacts are provided on the contactor 9a, in particular to provide safety-relevant switching functions.

The contactor 9a is ideally designed such that the lower part of the contactor housing is formed in the housing 2 itself, for example by plastic injection molding. Magnetic drives and switching chambers in the contactor 9a can then be mounted on this lower part, with simple steps. Connections for a control circuit for the contactor coil can also be integrated in a similar manner or in the same manner, and can once again be connected to a control board by way of a direct plug connector.

The control board is preferably accommodated parallel to the longitudinal axis of the contactors 9a, 9b on the side of the housing 2 remote from the winding bushing. This ensures isolation in accordance with regulations between a power switching area and a signal or data processing data.

Furthermore, an isolating separating wall, for example a hard paper panel, is provided between the control board and the contactors 9a, 9b, for electrical isolation between the two areas. Two parallel webs, which form a U-shape, can be arranged in the housing 2 in order to attach the isolating separating wall in a simple manner. It is also advantageous for the control board to be attached, for example by way of snap-action connectors, via plastic spacers to the side of the isolating separating wall which is remote from the contactors 9a, 9b.

The housing 2 furthermore has a control input 13a. A further control input 13b may optionally also be arranged on the housing 2. Both control inputs 13a, 13b are used as what is referred to as a control signal connection. Plug points on the control inputs 13a and 13b are passed to the outside of the housing 2, so that control lines or modules can be connected.

Any caps or housings required for the plug points may likewise be integrated in the housing 2 itself. The control input 13a is used for supplying signals indirectly, while the control input 13b is used for supplying signals directly. The signals are supplied from a higher-level, external signal supply unit, which is not shown in any more detail here.

A communication module 14a or 14b can be arranged within or outside the housing 2, and is used as an interface module or as a bus coupler. The signals are supplied indirectly in this case via the respective communication module 14a, 14b, which in this case acts on the control unit 5. The signals are normally supplied directly to the control unit 5 by switching the control voltage on or off. The indirect and direct supply of the signals can also act jointly on the control unit 5.

The communication module 14a, 14b has an interface 15a or 15b, respectively. These interfaces 15a and 15b allow communication via a data bus system, which is not shown here. A link to different data bus systems, such as AS-i, EIB, CAN or else Profibus DP can be provided by way of an appropriately adapted communication module. The control unit 5, in the form of a control board, has connecting elements for all the internal connections that are required in the housing 2 and for the communication module 14b, which may be arranged outside the housing 2. These connecting elements are optionally in the form of spring tongue terminals and/or are in the form of a group plug connector.

The connection for the communication module 14a and 14b is preferably produced via a flexible ribbon cable with a group connector. This type of link in conjunction with a square basic structure of the communication module 14a, 14b allows the housing 2 and the communication modules 14a and 14b to be associated such that they are each rotated through 90°. This is advantageous in particular if the installation conditions on the housing 2 or on the motor housing 4 are confined, or for matching to a predetermined cable route.

A different type of bus is used at one input 12 of the housing 2. In this case, the housing 2 has a plug connector which is integrated in the housing wall and forms the input 12 for the connection to a power supply network. One or more contact elements or plug points may be arranged at the input 12 and thus on the outside of the housing 2, and are used for connecting the power supply network to the control apparatus 1, and possibly to the motor 3 as well. The internal power connections are likewise connected directly to the contactors 9a, 9b. Any caps or housings required for the contact elements or plug points can be integrated on the housing 2 itself, as described above.

The contact elements may optionally be designed such that it is possible to loop the power supply through. This results in a power bus system in addition to the data bus system. The power supply, which is normally also referred to as the main power, may be a single-phase or polyphase system, in particular also a three-phase system, or may be based on a DC voltage potential.

The user can start to operate the control apparatus 1 without opening the housing 2, just by plugging on the connecting cables. A quick precoded electrical connection can be produced by using prefabricated connecting cables.

Switching processes for the motor, for example on, off, counterclockwise running, clockwise running, soft starting and start/delta starting are provided via electromagnetic switching elements 8a, 8b which are arranged in the housing 2, and which may be oriented virtually as required. The connection and wiring of the electrical magnetic switching elements 8a, 8b can be adapted on an application-specific basis if required, and can be carried out quickly, easily and expediently by way of a standardized contact and connecting device.

Overload protection is provided by thermocouples which are integrated in the motor windings. A control unit 5 is arranged in the housing 2 in order to evaluate the thermocouple signals and to control and monitor the switching elements 8a, 8b, and is in the form of a control board. At least one element for overcurrent protection is integrated in the control element 6 which is arranged downstream from the control input 5, and is operatively connected to the respectively associated electromagnetic switching element 8a, 8b, and thus to the appropriate contactor 9a, 9b. The overload and/or overcurrent protection elements may, of course, also be arranged or embodied in a combination or in an optional connection to the control unit 5 or to the control element 6.

When motors are being operated, a temperature which is higher than the ambient temperature is produced in the motor terminal box just from the intrinsic heating from the motor. Further climatic influences, for example the influences of an external heat source that is not part of the operation or else, for example, that of a magnet coil which is permanently energized and thus emits heat can lead to poor boundary conditions. The use of electromagnetic switching devices in the motor terminal box has until now been impossible inter alia because the switching devices are designed as standard, owing to their coil heating, only for an environmental climate which is considerably lower than the temperature mentioned above in the motor terminal box.

This can be overcome by skilful operation of the electromagnetic switching devices 8a, 8b. This is done via the control board in the control unit 5 and the electronic operation, associated with this, of the electromagnetic switching devices 8a, 8b by way of a control signal 7, which is in the form of a clock signal. Since the contactor coils can be pulsed, this results in a considerable reduction in the coil heating. This therefore makes it possible to operate the electromagnetic switching elements 8a, 8b within a closed housing 2, in particular in the motor terminal box.

The embodiment of the control signal 7 in the form of a clock signal is chosen such that, on the one hand, the clock interval is as long as possible and, on the other hand, the time for which the clock signal acts is kept as short as possible. This has a positive effect on reducing the amount of heat which is produced in the contactor coil. Nevertheless, with this type of operation, a contactor coil is energized all the time and it therefore does not lead to any reduction in the reliability in terms of the switching capacity.

The use of electromagnetic elements 8a, 8b also ensures that the motor windings are disconnected from the power supply on the basis of an air gap. The switch position of the contactors 9a, 9b is also monitored by way of positively controlled break contacts and associated evaluation electronics.

Signals are supplied and an acknowledgement is returned via control lines. The control signals for the motor 3 are optionally transmitted by a direct drive or via a communication module 14a, 14b for an industrial data bus system. An additional plug apparatus is provided for this purpose, via which the auxiliary voltage and the communication module 14a, 14b can be connected to the control unit 5.

The interface 15a, 15b between the control unit 5 and the communication module 14a, 14b is chosen such that all the functions which are required for motor protection, for switching device control and for the self-monitoring of the motor 3 are located in the control unit 5. On the other hand, the communication module 14a, 14b contains all the functions which are required for data conversion. This type of functional breakdown on the one hand allows the motor 3 to be driven directly and on the other hand allows simple linking to different data bus systems via appropriately adapted communication modules.

The invention claimed is:

1. A control apparatus for a motor, comprising:
   a housing, associateable with the motor and in which a control unit and a control element are arranged, wherein
      the control element is supplied with a control signal by the control unit,
      the motor is located in a separate housing, and
      the control element further includes,
         an electromagnetic switching element, wherein the control signal is in the form of a clock signal which, taking into account at least one heat source at least one of within and outside the housing, is designed such that the operating temperature of the electromagnetic switching element is below an upper maximum permissible limit value.

2. The control apparatus as claimed in claim 1, wherein the electromagnetic switching element includes at least one contactor.

3. The control apparatus as claimed in claim 2, wherein the contactor is provided with at least one of overload and overcurrent protection.

4. The control apparatus as claimed in claim 1, wherein the housing includes at least one input for connection to a power supply network.

5. The control apparatus as claimed in claim 1, wherein the housing includes at least one control input for the control unit.

6. The control apparatus as claimed in claim 1, wherein the control unit is at least one of directly and indirectly drivable via a communication module.

7. The control apparatus as claimed in claim 6, wherein the communication module includes an interface to a bus system.

8. The control apparatus as claimed in claim 6, wherein the communication module is rotatably arranged on the housing.

9. The control apparatus as claimed in claim 2, wherein the control unit is at least one of directly and indirectly drivable via a communication module.

10. The control apparatus as claimed in claim 9, wherein the communication module includes an interface to a bus system.

11. The control apparatus as claimed in claim 3, wherein the control unit is at least one of directly and indirectly drivable via a communication module.

12. The control apparatus as claimed in claim 11, wherein the communication module includes an interface to a bus system.

13. The control apparatus as claimed in claim 4, wherein the control unit is at least one of directly and indirectly drivable via a communication module.

14. The control apparatus as claimed in claim 13, wherein the communication module includes an interface to a bus system.

15. The control apparatus as claimed in claim 5, wherein the control unit is at least one of directly and indirectly drivable via a communication module.

16. The control apparatus as claimed in claim 15, wherein the communication module includes an interface to a bus system.

17. The control apparatus as claimed in claim 7, wherein the communication module is rotatably arranged on the housing.

18. A control apparatus for a motor comprising:
   a control element; and
   control means for providing a control signal, in the form of a clock signal, based on at least one heat source at least one of within and outside a housing of the control element, such that an operating temperature of the control element is below an upper maximum permissible limit value, the housing of the control element being associateable to a motor arranged in a separate housing.

19. The control apparatus of claim 18, wherein the control element includes at least one contactor which is provided with at least one of overload and overcurrent protection.

20. A method for controlling operation of a motor, the method comprising:
   providing a control signal; and
   controlling an electromagnetic switching element using the control signal based on at least one heat source at least one of within and outside of a housing of the electromagnetic switching element, the electromagnetic switching element being controlled such that the operating temperature of the electromagnetic switching element remains below an upper maximum permissible limit value; wherein
      the control signal is in the form of a clock signal, and
      the motor is located in a housing separate from the housing of the electromagnetic switching element.

21. A control apparatus for a motor, comprising:
   a housing, including a control unit and a control element, associateable with a motor, wherein
      the control element is supplied with a control signal by the control unit,
      the control element includes, an electromagnetic switching element, wherein
      the control signal is in the form of a clock signal, which is designed such that the operating temperature of the electromagnetic switching element is below an upper maximum permissible limit value by taking into account at least one heat source, which is at least one of within and outside the housing, and which is designed such that a contactor coil, of the electromagnetic switching element, is constantly energized.

* * * * *